Aug. 16, 1932.   J. T. COWLEY ET AL   1,872,620
CONVEYING APPARATUS
Filed May 1, 1930    10 Sheets-Sheet 10
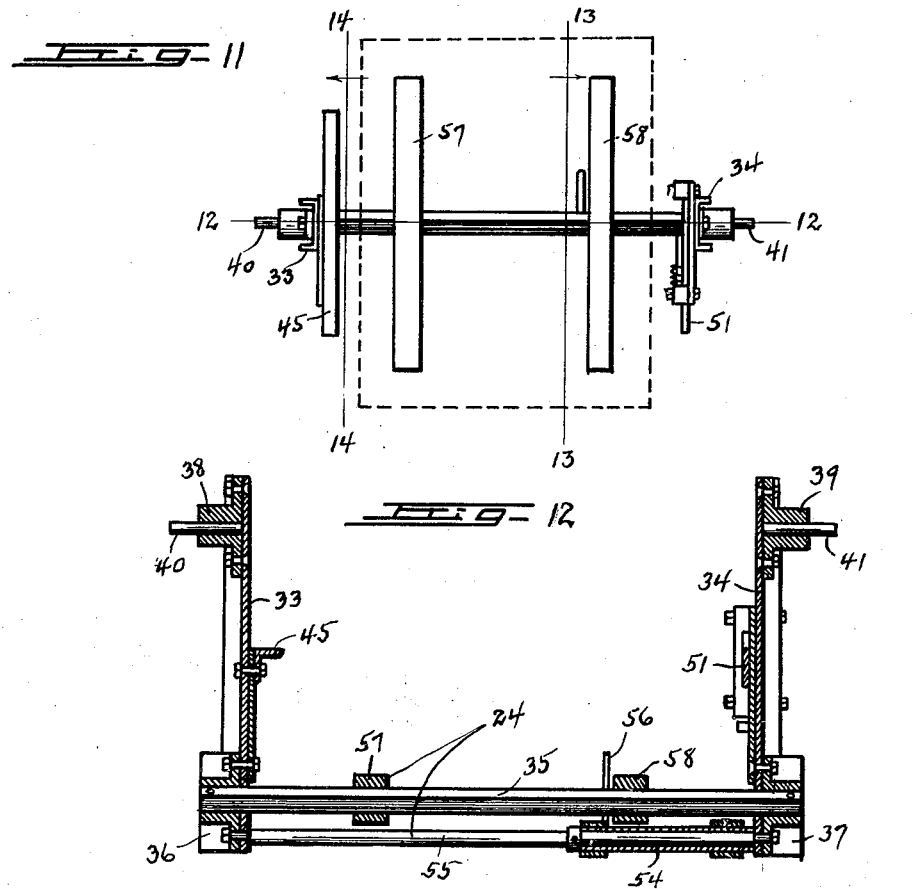
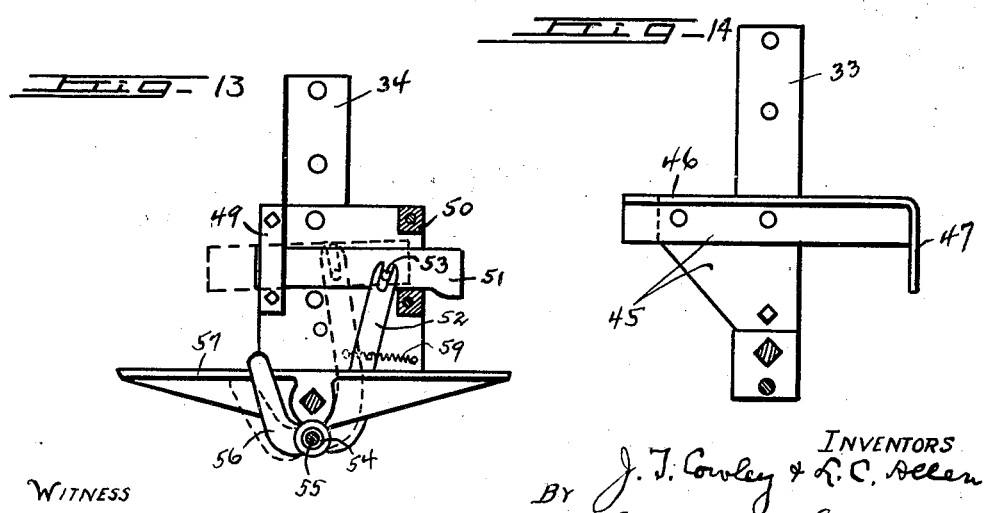

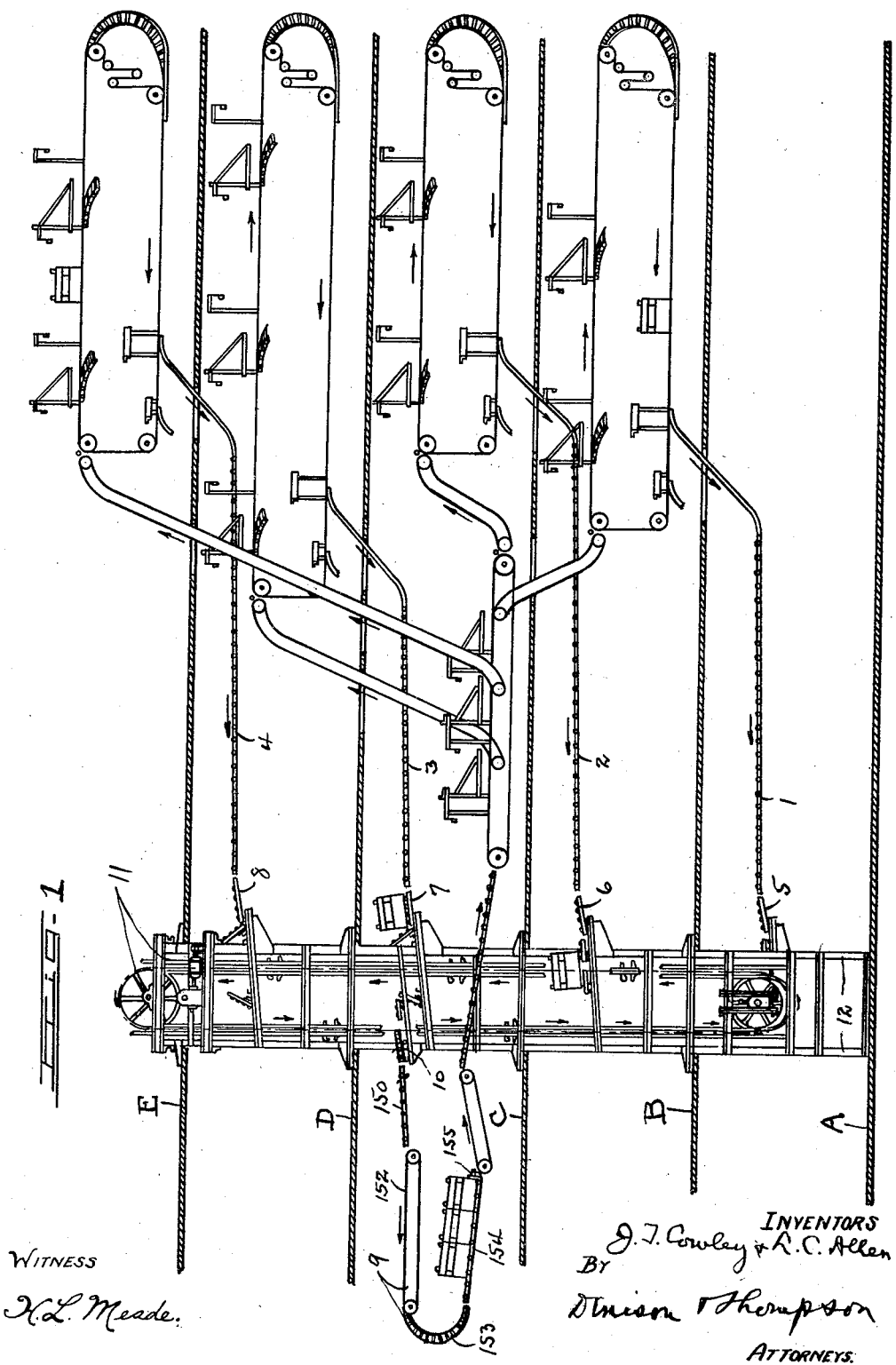

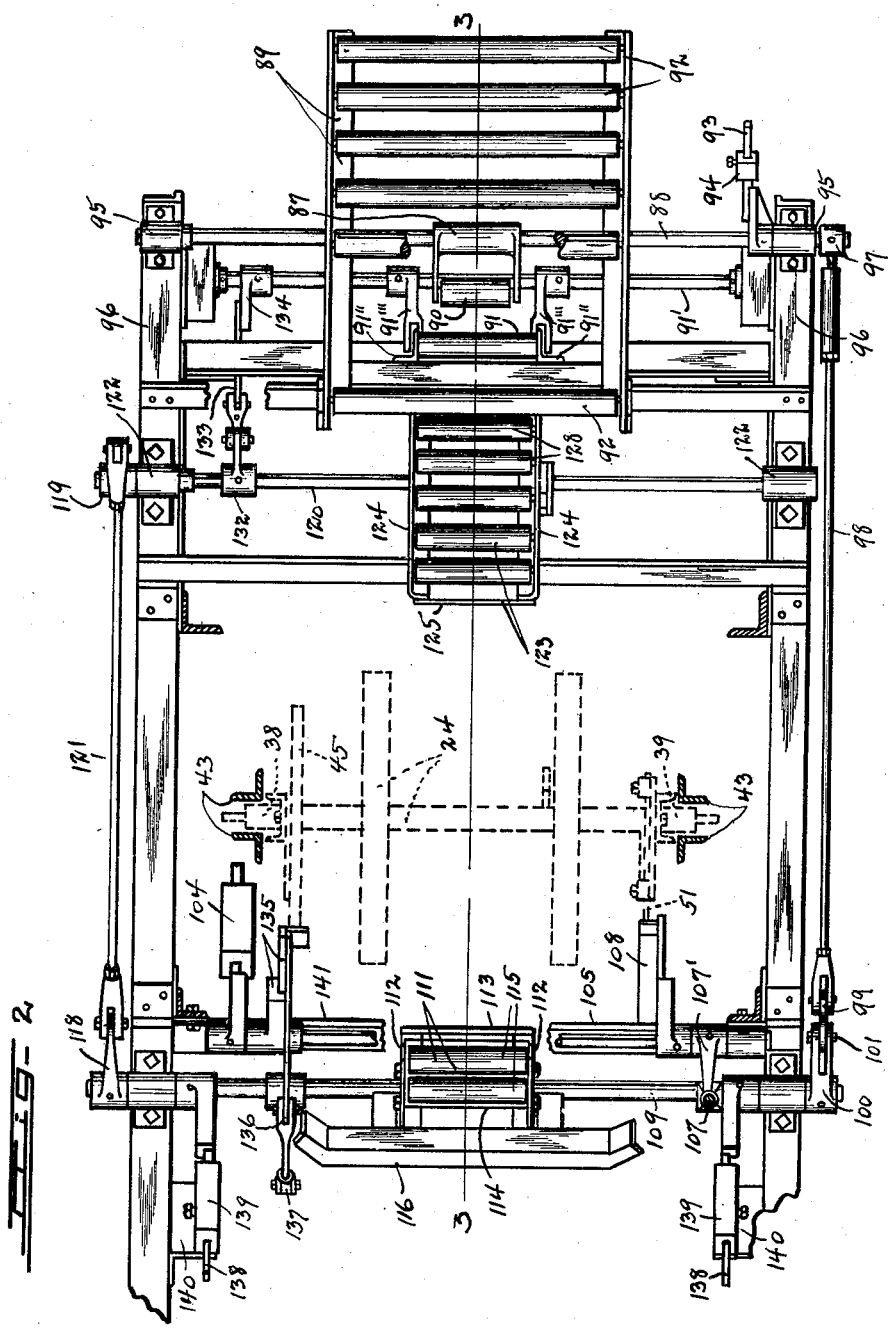

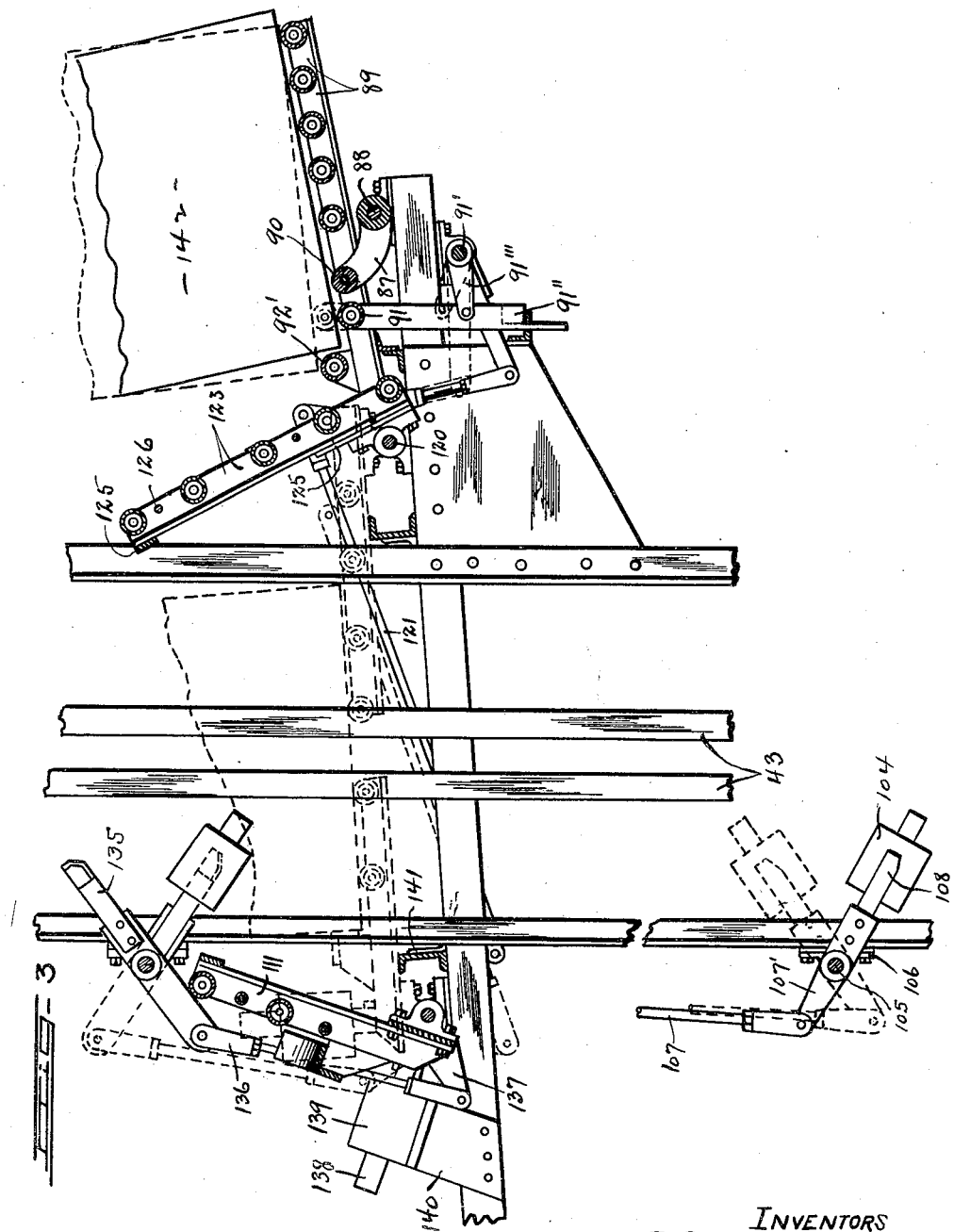

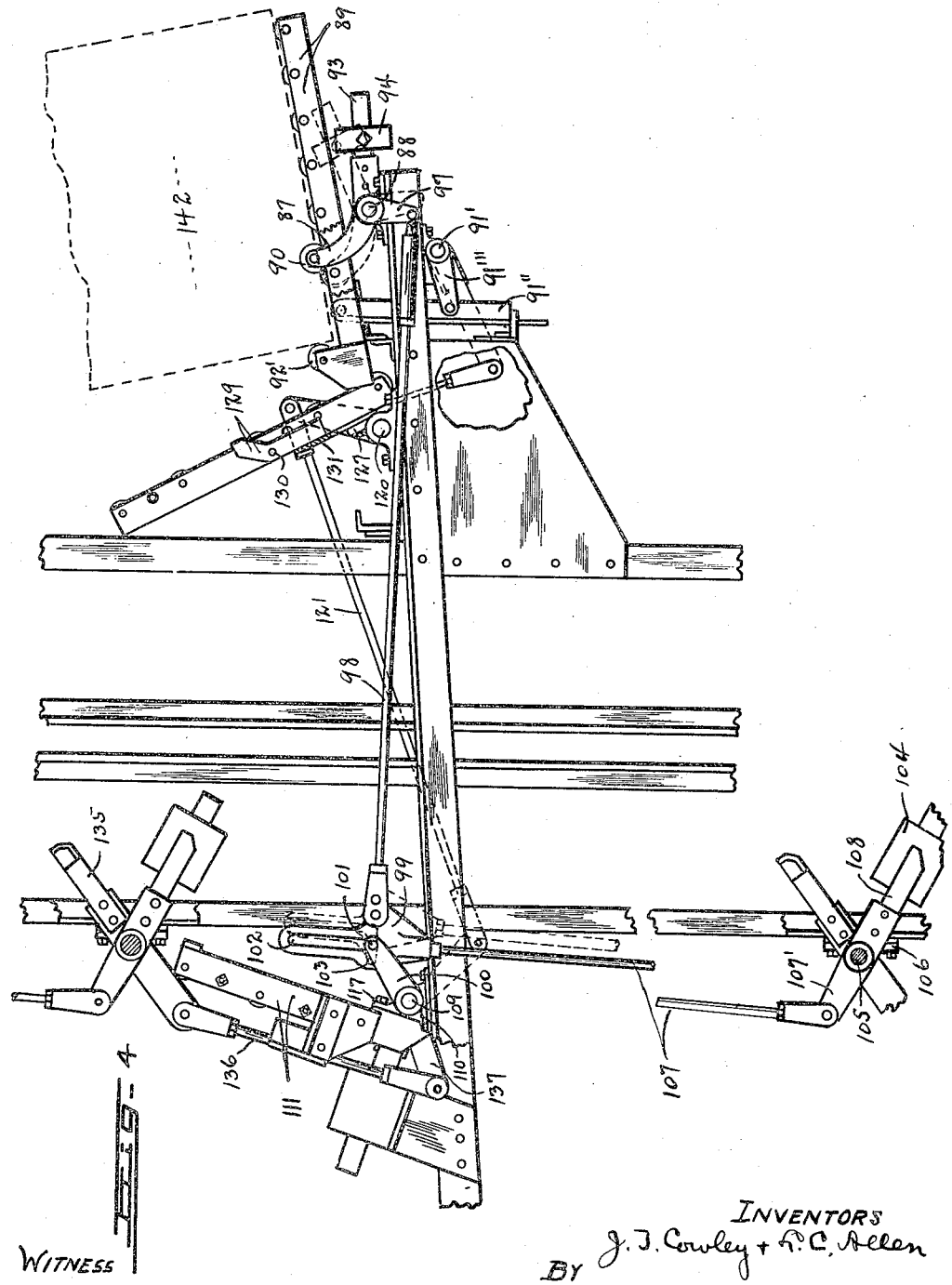

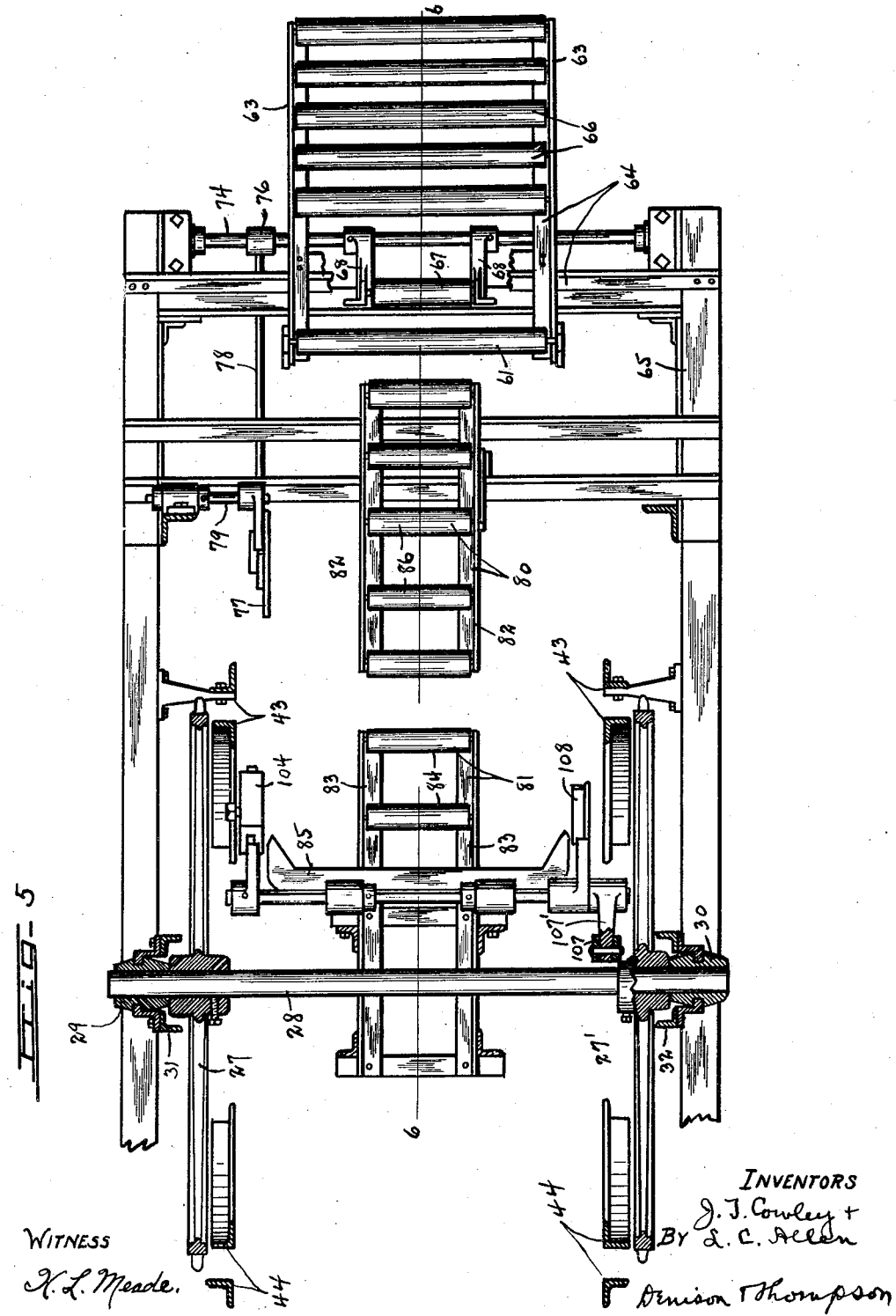

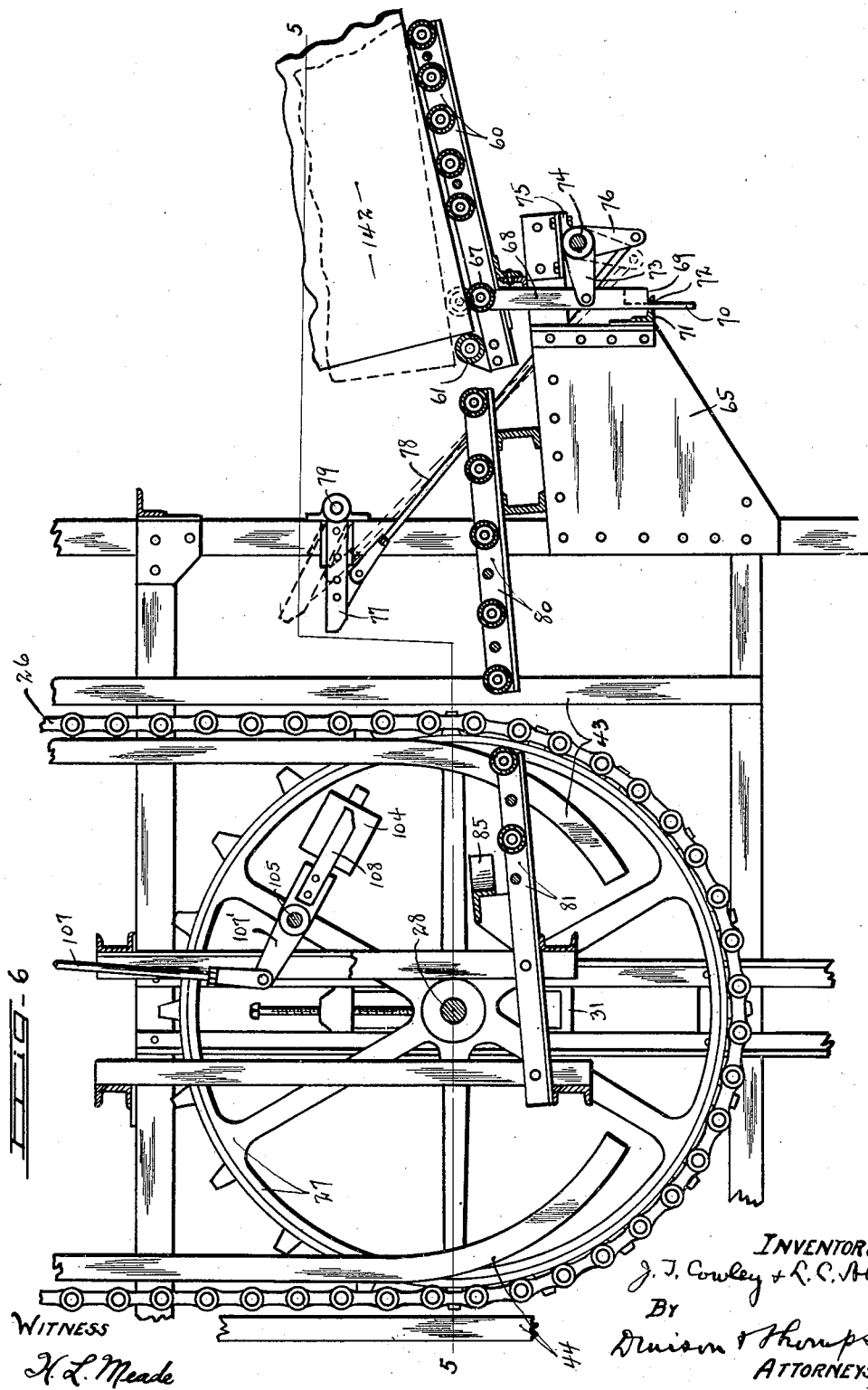

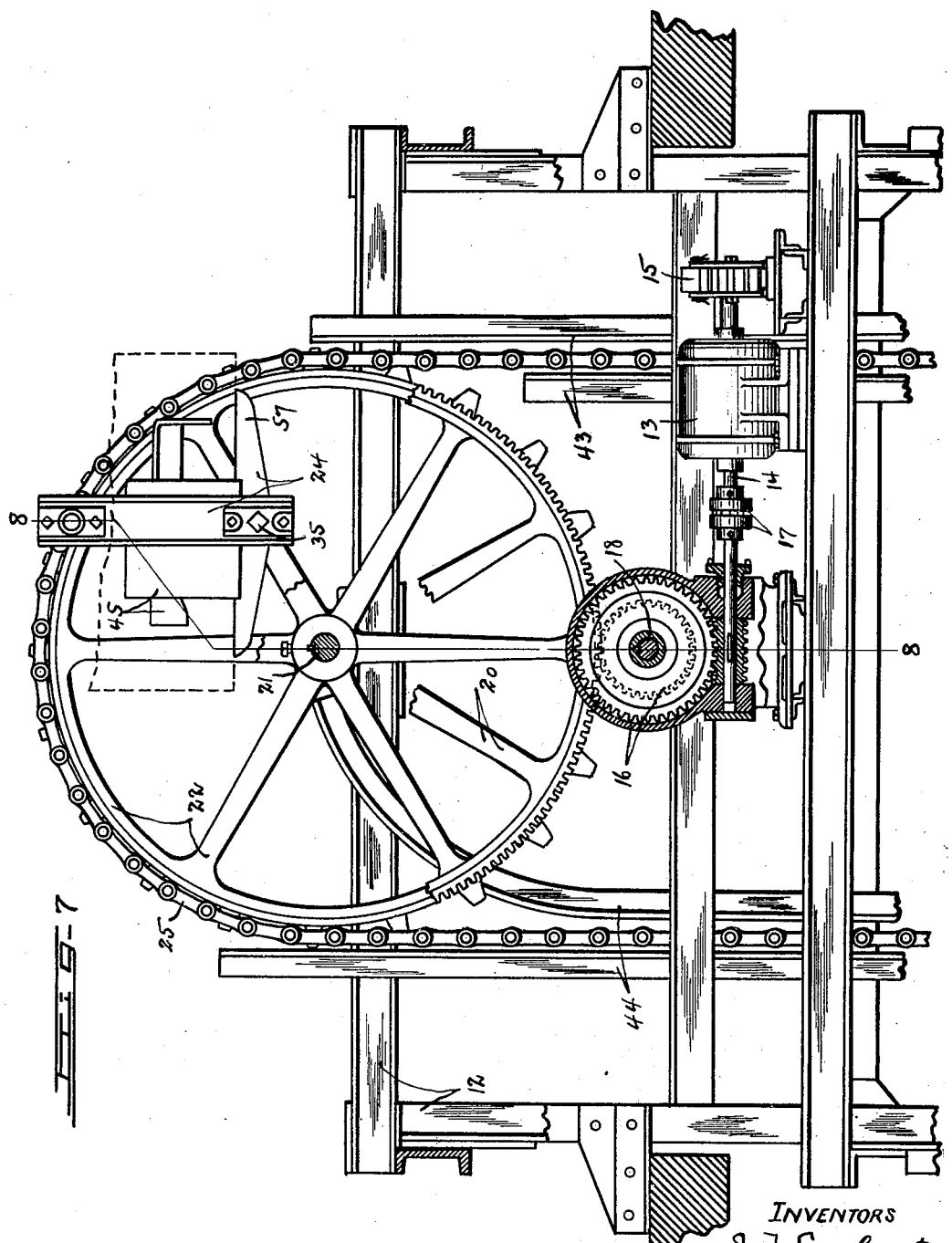

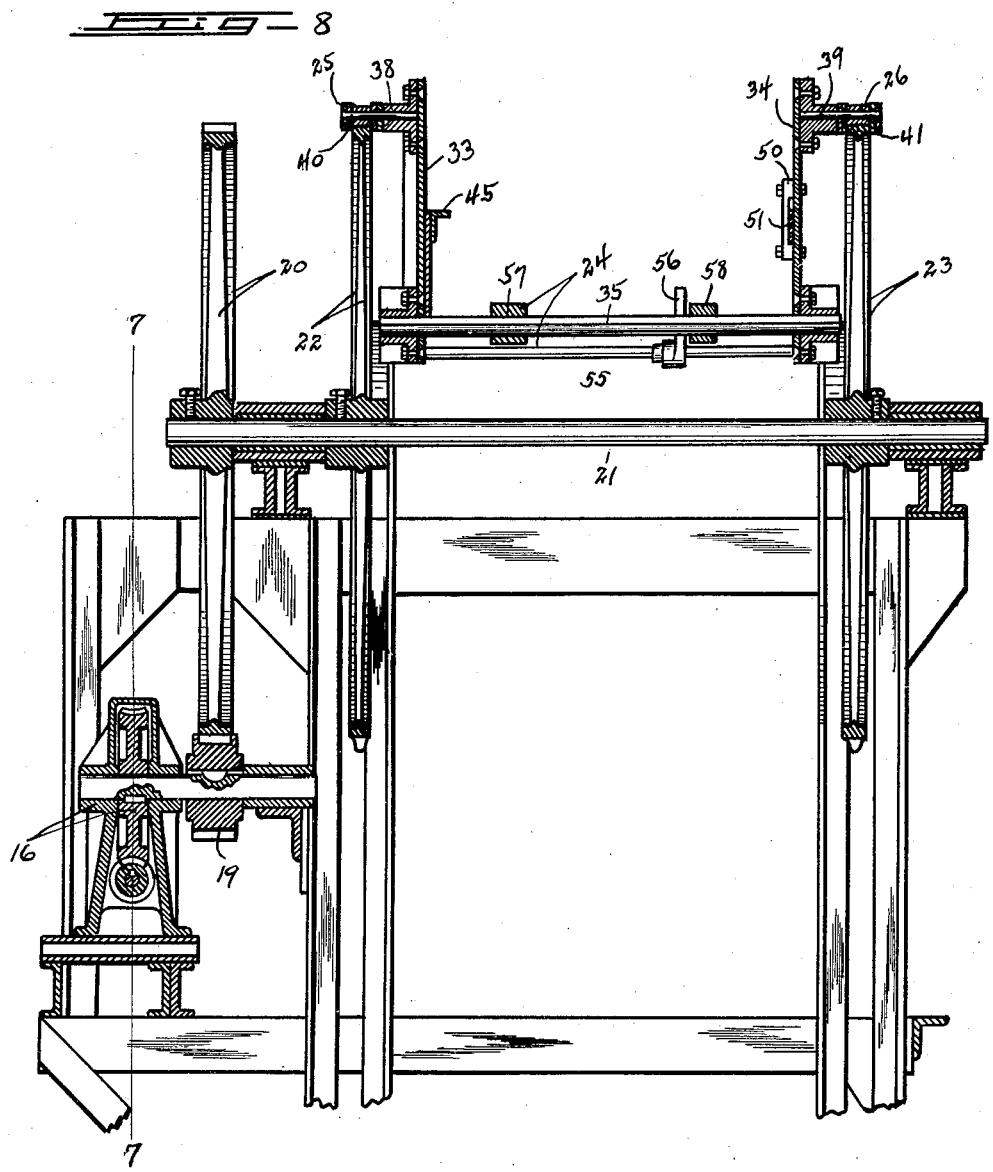

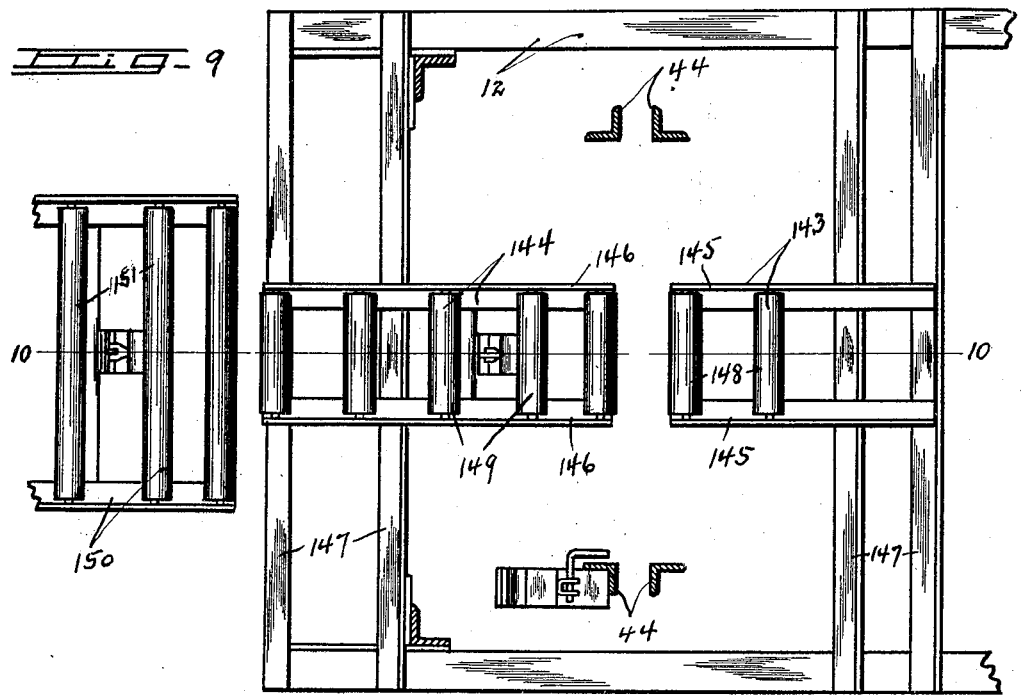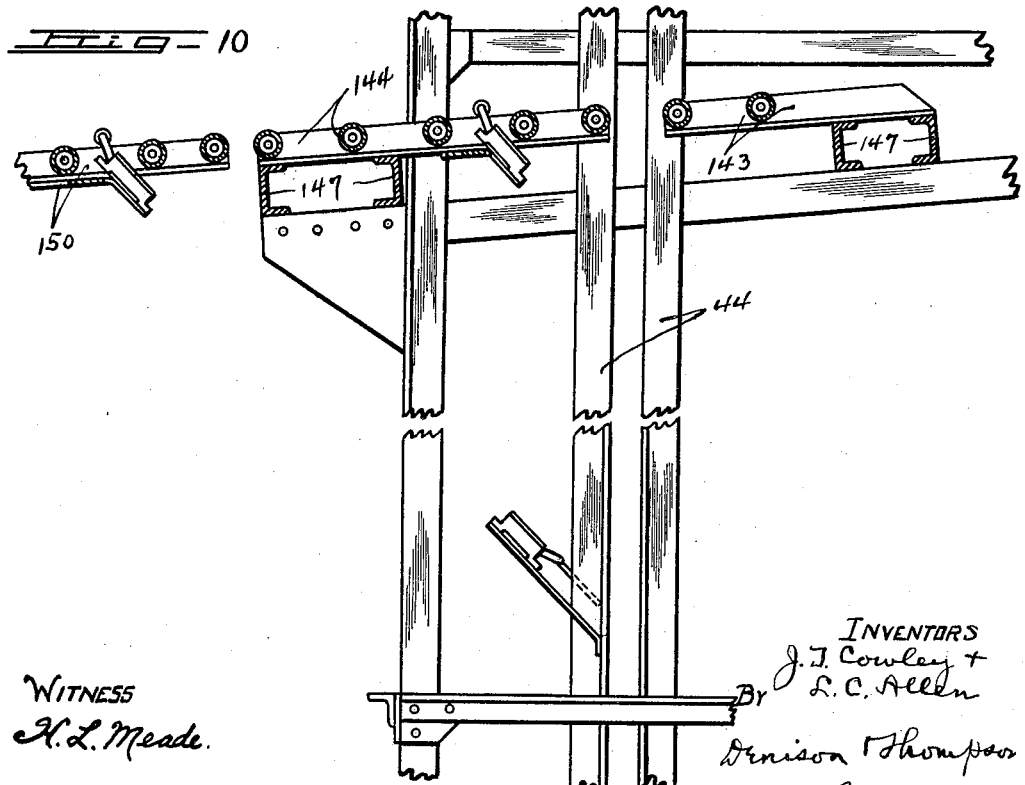

Patented Aug. 16, 1932

1,872,620

UNITED STATES PATENT OFFICE

JAMES T. COWLEY, OF NORTH SCITUATE, MASSACHUSETTS, AND LAVONT C. ALLEN, OF SYRACUSE, NEW YORK, ASSIGNORS TO THE LAMSON COMPANY, OF SYRACUSE, NEW YORK, A CORPORATION OF MASSACHUSETTS

CONVEYING APPARATUS

Original application filed October 17, 1927, Serial No. 226,659. Divided and this application filed May 1, 1930. Serial No. 449,028.

This invention relates to a new and improved conveyor and is particularly directed to an apparatus for elevating and lowering automatically packages, and is a division of our co-pending application for conveying apparatus filed Oct. 17, 1927, Serial No. 226,659.

The main object of our invention is to provide a vertical conveyor which will automatically pick up packages from other conveyors and return and discharge them to a storage conveyor.

Another object is to provide a vertical conveyor which is adapted to pick up packages from conveyors on several floors of a building, the apparatus being so constructed that the cars of the vertical conveyor will pick up a package from a conveyor on a floor if the car is unloaded, but which will pass such floor if it is loaded.

Other objects and advantages relate to the size, shape and arrangement of parts all as will more fully appear from the following description taken in connection with the accompanying drawings in which:—

Figure 1 is a diagrammatic view of my invention showing several floors of a building equipped with a conveying system from which and to which a vertical conveyor receives and delivers packages.

Figure 2 is a horizontal section through the loading side of our vertical conveyor showing one of the automatic movable loading stations in top plan. An automatic selective elevator car is shown in dotted lines as it would appear in passing up through the station, a portion of the fixed gravity feed being broken away to better disclose the automatic lock trip.

Figure 3 is a detail vertical section taken in the plane of line 3—3, Figure 2. The full lines show the automatic movable loading station with a package fed on to the fixed gravity feed in readiness to be automatically released and fed over the lowered platforms into the path of an incoming automatic selective vertical conveyor car, the lowered platforms being shown in dotted lines.

Figure 4 is a side elevation of a portion of one side of a vertical conveyor together with an automatic movable loading station, some portions of which are broken away to better reveal the mechanism thereof. The full lines show the station in its normal empty position while the dotted lines indicate the positions which the different parts assume when a package is fed on to the fixed gravity feed, thereby forcing the automatic lock arm downward to bring the station closing lever into locking engagement.

Figure 5 is a horizontal section of the lower sprocket wheel of the vertical conveyor taken in the plane of line 5—5, Figure 6, and also showing the fixed automatic loading station in top plan.

Figure 6 is a detail vertical section of the fixed loading station taken in the plane of line 6—6, Figure 5.

Figure 7 is a detail vertical section of the drive or upper end of the vertical conveyor taken in the plane of line 7—7, Figure 8, the drive gear and one sprocket wheel being partially broken away to better illustrate the movement of the car together with its load in passing from one side of the vertical conveyor to the other.

Figure 8 is a detail vertical cross section of the drive end of the vertical conveyor and of one of the vertical conveyor cars taken in the plane of line 8—8, Figure 7.

Figure 9 is a horizontal section taken through the unloading side of the vertical conveyor showing the fixed unloading station in top plan.

Figure 10 is a detail vertical section taken in the plane of line 10—10, Figure 9.

Figure 11 is a top plan of one of the automatic selective vertical conveyor cars showing in dotted lines, the outline of a package in carrying position.

Figure 12 is a longitudinal vertical section of a vertical conveyor car taken in the plane of line 12—12, Figure 11.

Figures 13 and 14 are detail vertical sections taken in the plane of lines 13—13 and 14—14 respectively, of Figure 11, showing the automatic tripping mechanism.

As illustrated on the diagrammatic view, Figure 1, our vertical conveyor is shown as used in connection with a particular type of distributing conveyors disclosed and claimed in our co-pending application above referred to, but it will be understood that our vertical conveyor is adapted to be used with any type of conveyor designed to deliver packages to the loading stations of the vertical conveyor and also adapted to receive packages from such vertical conveyor.

Or, our invention may be used independently of any delivering conveyors provided only means is provided for delivering packages to the loading stations of the vertical conveyor.

In the diagrammatic view, Figure 1, A, B, C, D and E represent the first, second, third, fourth and fifth floors respectively of a building to be used for the storing of merchandise.

The particular function which the vertical conveyor performs in the conveying system disclosed in our co-pending application is to receive from the storage floors, pilot cars which have been employed to direct conveyors of merchandise cars to various storage places on the different floors and to return such pilot cars to their starting station.

The conveyors on the different floors are constructed and arranged so that when a pilot car has performed its function, it will be automatically conveyed to the loading station of the vertical conveyor on the particular floor on which it is then located.

In the particular way in which the main conveying system here shown is arranged, gravity rolls as 1, 2, 3 and 4 are provided to carry the returning pilot cars to the loading platforms 5, 6, 7 and 8 of the vertical conveyor.

There is also provided a receiving and storage conveying system 9 to receive the pilot cars from the unloading station 10 of the vertical conveyor.

The vertical conveyor 11 consists of a vertical framework 12 divided into two vertical conveyor shafts secured, in this instance, to the floor A, Figure 1, and extending upwardly through suitable openings in the succeeding floors, B, C, D and E.

An electric motor 13, Figure 7, mounted on the framework 12 near the upper end of the vertical conveyor 11 has a drive shaft 14 protruding from each end thereof.

A solenoid brake mechanism 15 of any suitable make is secured to the drive shaft 14 located at one end of the motor 13 while the drive shaft 14 at the opposite end of the motor is connected to a speed reducing gear mechanism 16 also mounted on frame work 12 by a slidable coupling 17.

To the drive shaft 18 of the speed reducing gearing 16 is keyed or otherwise secured a pinion 19, Figure 8, which meshes with and drives a gear 20 mounted on one end of the conveyor drive shaft 21, which is journaled in suitable bearings secured to the top of the conveyor framework.

Two sprocket wheels 22 and 23 are secured to the drive shaft 21 between the bearings thereof and spaced from each other a sufficient distance to permit an elevator car 24, Figure 7, to pass between them as it is carried along by the endless chains 25 and 26 to which the elevator car 24 is pivoted, as the chains pass about the peripheries of said sprocket wheels 22 and 23 respectively.

As the endless sprocket chains 25 and 26 leave the sprocket wheels 22 and 23, they travel down the rear side of the vertical conveyor past the unloading station and about the periphery of sprocket wheels 27 and 27' respectively, Figures 5 and 6, mounted upon a horizontal rotating shaft 28 journaled in suitable bearings 29 and 30, mounted in ways 31 and 32, secured to the framework at or near the lower end of the vertical conveyor 11.

The sprocket chains 25 and 26 then complete their cycle of travel by passing up the front side of the vertical conveyor past the loading stations and thence to the drive sprocket wheels 22 and 23 at the top of the conveyor.

The elevator car 24 is composed of two vertical side arms 33 and 34, Figure 12, connected together and held in spaced relation by a square shaft 35 which has its opposite ends pinned to guide members 36 and 37 which are secured to the outer face of the lower ends of side arms 33 and 34 respectively.

To the outer face of the upper ends of side arms 33 and 34 are bolted or otherwise secured guide blocks 38 and 39.

In guide block 38 is rotatably mounted a pin 40 and a similar pin 41 is rotatably mounted in guide block 39. Pins 40 and 41 protrude from the outer face of guide blocks 38 and 39 a sufficient distance to pass through the eyes in the links of sprocket chains 25 and 26 respectively, and serve as one of the link-connecting pins for such chains, thereby connecting the elevator car to the chains.

The guide blocks 38 and 39 extend outwardly from the outer face of the vertical arms 33 and 34 sufficiently to travel between opposed pairs of guide rails 43, Figure 2, secured to the framework 12 of the vertical conveyor adjacent the side of the conveyor in which are positioned the loading stations hereinafter to be described.

A similar pair of opposed guide rails 44, Figure 9, are positioned adjacent the side of the conveyor on which is provided the unloading station about to be described.

As may best be seen from Figure 7, the upper ends of the guide rails 43 are open so that the guide blocks 38 and 39 may leave them to permit the car 24 to be carried over the sprocket wheel 20 and then downwardly to bring the guide blocks 38 and 39 between the guide rails 44 which are also open at the top.

As may best be seen from Figure 6, the guide rails 44 are open at the lower end so that the car may move downwardly around sprocket 27 and then upwardly to bring the guide blocks 38 and 39 in between the guide rails 43 which are also open at the bottom.

The guide rails 43 and 44 extend substantially in the plane of the vertical travel of the sprocket chains 25 and 26 thereby holding the elevator car 24 in its normal upright position and preventing the car from swinging or rocking about the supporting or carrying pins 40 and 41.

Referring to Figure 14 there is secured to the inner face of the vertical arm 33 of the car 24 a fixed trip lever 45 which extends transversely of the arm 33 and is positioned some distance above the floor supporting shaft 35. The rearward radial arm 46 thereof actuates a rock arm to open the movable loading station hereinafter to be described while the front radial arm 47 actuates the trip arm of the automatic feed on the stationary loading station hereinafter to be described, said arm 46 having its outer end projected downwardly at right angles to form an elongated bearing face 47 for the purpose of holding the automatic feed in operating position a sufficient length of time to insure the loading of the car from the station.

Referring to Figure 13, a plate 48 is secured to arm 34 and carries on its opposite end, opposed guide bars 49 and 50. In guide bars 49 and 50 is slidably mounted a station trip lever 51.

The trip lever 51 is moved to and from its normal operating position by a rock arm 52 and is connected thereto by a pin 53 secured to trip lever 51 and moving in a slot in the upper end of the rock arm 52.

The lower end of rock arm 52 is rigidly secured to one end of a tubular shaft 54 which is rotatably mounted on a shaft 55 secured to the lower ends of vertical arms 33 and 34.

To the other end of tubular shaft 54 is secured a second rock arm 56 which projects forwardly and upwardly therefrom between two radial floor arms 57 and 58 and a short distance above the upper faces of such floor arms 57 and 58.

Floor arms 57 and 58 are rigidly mounted in spaced relation and intermediate their ends upon the square shaft 35. Inasmuch as the arms 57 and 58 constitute the bottom floor of the vertical elevator car 24, it will be apparent that as a flat bottomed article such as a car comes to rest upon the floor arms 57 and 58, the rock lever 56 will be forced downwardly about the axis of the supporting shaft 55 thereby rotating the tubular shaft 54 a sufficient amount to cause the rock lever 52 carried thereby to move inwardly against the stop pin 53 on the trip lever 51 to thereby draw the trip lever 51 inwardly to the position shown in dotted lines, Figure 13.

A retracting spring 59 has one end secured to the rock arm 52 and has the other end secured to the plate 48 so that when the load leaves the car 24, the spring 59 will cause the rock arm 52 to be moved outwardly about the pivot 55 to thereby move the station trip lever 51 to its normal position.

A fixed loading station 5 located at or near the lower end of the vertical conveyor 11 receives the cars from the gravity conveyor 1. The fixed loading station 5 is provided with a short section of gravity roll conveyor 60, Figure 6, which is provided at its forward end with a stop roll 61 to arrest the forward movement of the car 142.

The fixed gravity feed consists of opposed side rails 63, Figure 5, secured to the conveyor frame at an angle thereto in any suitable manner, as by a bracket 64, composed of two angle irons with their adjacent flanges riveted together, and one of the two remaining flanges fastened to the bottom of the side rails 63, while the other flange is secured to a suitable bracket 65 fastened to the frame 12 of the vertical conveyor.

Between the side rails 63 and at the upper outer end thereof are a plurality, in this case shown as five, of suitable gravity rolls 66 journaled in spaced relation in the side rails 63.

The stop roll 61 is journaled in the lower ends of side rails 63. Between the rolls 66 and the stop roll 61 is an automatic feed roll 67 held in its normal position in the horizontal plane of the gravity rolls 66 by two opposed vertical posts 68, the feed roll 67 being journaled in the upper ends of such posts 68.

Referring to Figure 6, the vertical posts 68 have a portion of their lower ends cut away to form a shoulder 69 and a tail piece 70, the shoulder 69 resting upon a flange member 71 secured to the bracket 65 which limits the downward movement of the posts 68 carrying the feed roll 67.

The tail pieces 70 pass through slots 72 in the flange member 71 and act as guide supports for the lower end of the posts 68. To each of the vertical posts 68 and intermediate the ends thereof is pivoted one end of a crank arm 73 having its other end rigidly mounted on a rock shaft 74 journaled at its ends in suitable bearings 75 secured to the bracket 65.

In a vertical plane at one side of the fixed loading station and between one of the rock arms 73 and bearing 75 is a rock arm 76 rigidly mounted upon the shaft 74 and connected to a feed trip arm 77 by a connecting rod 78.

The feed trip lever 77 is located above the plane of the loading station and is pivoted at one end to a horizontal shaft 79 mounted upon the frame 12.

The lever 77 extends inwardly a sufficient distance to be in the path of movement of the radial arm 46 mounted on the car 24.

The station loading platforms 80 and 81, Figure 5, are composed of side rails 82 and 83 respectively secured in spaced relation at their outer ends to horizontal cross members secured to the frame work of the vertical conveyor and at an angle thereto, while their inner ends are spaced from each other sufficiently to permit the free passage therebetween of the elevator car supporting bar 35.

Between the side rails 83 and journaled thereto are gravity rolls 84 positioned in spaced relation between the stop bar 85 on the station platform 81 and the inner end of station platform 81.

Between the side rails 82 of station platform 80 are positioned a plurality, in this case shown as five, of gravity rolls 86 in spaced relation, one of such rolls 86 being positioned at one end of station platform 80 and the other being positioned at the other end of station platform 80.

The over-all width of the station platforms 80 and 81 is less than the distance between the elevator car floor arms 57 and 58 to permit said floor arms to freely pass such station platforms 80 and 81.

The plane of the rolls 84 and 86 is the same and is at an angle to the horizontal plane of the stop roll 61 and cooperates with said stop roll to form a gravity conveyor from the fixed gravity feed 64 to the elevator car loading position.

The fixed automatic gravity feed 89 positioned at each of the movable loading stations 6, 7 and 8 on floors B, C and D is constructed substantially the same as the fixed loading station having spaced rolls 92 and a stop roll 92′ but in addition has an automatic lock-trip 87, Figures 2, 3 and 4, rigidly mounted on a rock shaft 88 in a horizontal plane below and at right angles to said gravity feed station 89.

At the upper end of the lock trip 87 and between two radial upward curved arms thereof is journaled a roll 90 held normally in a horizontal plane above the upper face of the gravity feed station 89 and between the automatic feed roll and the gravity rolls 92, journaled in parallel spaced relation to gravity feed station 89, by an arm 93 rigidly secured to rock shaft 88 and having a weight 94 adjustably mounted thereon.

The rock shaft 88 is journaled in bearings 95 on opposite sides of the brackets 96 by which the movable loading station is secured to the frame 12 of the vertical elevator.

Rock shaft 88 has a radial arm 97 secured to one end thereof and connected by a connecting rod 98 to one side of a station closing lever 99 located on the opposite side of the elevator frame 12 and held in operative engagement with a bifurcated crank arm 100 by a pin 101 rigidly secured in one end thereof and extending through a vertical elongated slot 102 in station closing lever 99. The vertical elongated slot 102 terminates at its lower end in a short horizontal rearwardly extending slot 103, said slot 103 having a slightly enlarged end.

The pin 101 is normally held in coaxial alinement with both the vertical and horizontal portions of the slot 102 by the action of the counter-weighted arm 93 which tends to force the station-closing lever 99 rearwardly and also by the action of a counterweight 104 rigidly secured to a rock shaft 105 journaled in bearings 106 in the frame 12 beneath the station closing lever 99. The station closing lever 99 is connected by a rod 107 to a crank-arm 107′ rigidly mounted on the rock shaft 105.

A radial arm 108 is rigidly mounted on rock shaft 105 and projects inwardly into the vertical path of the movable station trip lever 51 carried by the car 24 and is actuated thereby when said trip lever 51 is in its normal outward position as the elevator is approaching a movable loading station.

The crank arm 100 is rigidly secured to one end of a rock shaft 109 journaled horizontally in bearings 110 secured to opposite sides of the frame 12.

Rigidly secured to the rock shaft 109 in the vertical plane of the fixed gravity feed station is a movable station platform 111 composed of two side rails 112 held in spaced relation by a cross bar 113 secured to the lower face of either end thereof, and spacing rods 114 secured in spaced relation to the upper flanges of the side rails 112.

Near the inner ends of the side rails 112 and journaled therein in spaced relation are two gravity rolls 115 while secured to the top of the side rails 112 and projecting in a vertical plane therefrom is a fixed stop bar 116 of greater length than the width of the object to be loaded and having the ends thereof flanged outwardly and inwardly to act as centering guides to the object being loaded on the station platforms.

At the outer end of the side rails 112 and to the under face thereof are secured supporting brackets 117 which in turn are rigidly mounted on the rack shaft 109.

To the opposite end of the rock shaft 109 to which the crank arm 100 is mounted is rigidly secured a crank arm 118 connected to a second crank arm 119 mounted on a rock shaft 120 by a connecting rod 121.

The rock shaft 120 is journaled in suitable bearings 122 secured to the upper face of the brackets 96 in a horizontal plane below the fixed gravity feed station and a short distance ahead thereof.

Rigidly secured to the rock shaft 120 in the vertical plane of and co-acting with the loading platform station 111 is a second movable loading platform station 123 having side rails 124 held in spaced relation by cross bars 125 secured to the under face of the ends of the side rails 124 and spacing rods 126 secured in spaced relation to the upper flanges of side rails 124.

To the under face of the outer ends of the side rails 124 are secured two supporting brackets 127 rigidly secured on the rock shaft 120.

Journaled in the side bars 124 in spaced relation, is a plurality of, in this case shown as five, gravity rolls 128 which, when the loading platform stations 111 and 123 are lowered to the loading position, are in alinement and cooperate with the stop roll 91 on the fixed gravity feed station and the gravity rolls 115 carried by the loading platform station 111 to form a gravity conveyor to bring the object to be loaded into alinement with the vertical movement of the vertical conveyor car 24.

To the outside face of one of the side rails of the movable platform station 123 is secured a movable stop pawl 129 pivoted to one side of its center on a pin 130 carried by the side rail, the longer portion of the pawl 129 extending rearwardly and held normally parallel with the side rail by a rest member 131 which is secured to the underface of the side rail, while the shorter portion is turned upward at an angle to the side rail and projects above the plane of the loading platform station sufficiently to prevent the rebound of the object being loaded as it is brought to a sudden stop by the fixed stop bar 116.

To the rock shaft 120 at one side of the movable station 123 is rigidly secured a crank arm 132 connected by a connecting rod 133 to a radial arm 134 rigidly secured to the feed roll actuating rock shaft 91' thereby connecting the automatic feed roll 91 to the station operating mechanism.

Feed roll 91 is journaled between slidable spaced brackets 91'' operatively connected to spaced crank-arms 91''' rigidly secured to rock-shaft 91'. The disposition of parts is such that when the shaft 91' is rocked the feed roll 91 will be raised to a plane slightly above the stop roll 92'.

A rock arm 135, fulcrumed near the center thereof to the shaft 105, has one arm extending inwardly into the vertical path of the fixed trip lever 45 on the vertical conveyor car 24, while the other arm is connected by a connecting rod 136 to a radial arm 137 rigidly secured to the station rock shaft 109.

The movable platform loading stations 111 and 123 are held in their open position by radial arms 138 rigidly secured to the rock shaft 109 and having weights 139 adjustably mounted thereon and normally resting on fixed stops 140 secured to the framework 12 of the vertical conveyor, while the horizontal bars 141 positioned inside the station pivotal shafts and secured to the framework 12 limit the downward movement of said platform loading stations and hold them in the closed or loading position.

Although we have shown on Figures 2 and 3 parts of the operating mechanism for the next above loading station, it is not necessary to describe the same inasmuch as such mechanism functions in exactly the same way as the mechanism just described.

It will be apparent that the first elevator car 24 passing up through the fixed loading station 5 after a package 142, Figure 6, has been fed on to the fixed gravity feed thereof, will, as the arm 46 on the elevator car 24 engages the feed trip arm 77 carrying said trip arm upwardly, rotate the rock shaft 74 and lift the automatic feed roll 67 up to or above the horizontal plane of the stop roll 61, thereby carrying the front end of the package 142 up over the top of the stop roll 61 as shown in dotted lines on Figure 6.

By this time, the radial arm 46 on the elevator car 24 will have passed above the feed trip arm 77, thereby permitting said feed trip arm and the automatic feed roll 67 to return by gravity to their normal position.

The package is now free to gravitate on to the fixed station platforms 80 and 81 and be brought to an at rest position in the vertical path of the elevator car 24 by the fixed stop bar 85 mounted on the station platform 81 and thereby be ready to be picked up by the vertical elevator car 24.

As the package 142 is picked up by the vertical conveyor 24, the bottom of the package will come in contact with the detent 56 on the elevator car and force the movable station closing trip lever 51 inward out of the vertical plane of the radial arm 108 thereby permitting the vertical conveyor car to pass up through the movable loading station without actuating the loading platforms thereof.

As soon as the first package on the gravity feed station just described is fed on to the fixed loading platform 80 any succeeding package remaining outside the station on the gravity conveyor 1 will immediately roll on to the gravity feed station 64 ready to be automatically fed on to the loading platform 80 by the action of each conveyor car upon the feed roll 67.

The vertical conveyor cars 24 will thus continue to load from the bottom or fixed loading station until all the packages at that station have been removed. The first vertical conveyor car 24 which passes through the fixed loading station without picking up a package will, through the medium of the station closing trip lever 51 coming in contact with the radial arm 108, rock the lever 107', Figure 4, downwardly thereby forcing the station closing lever 99 downwardly and if there is no package waiting on the gravity feed station 89, the pin 101 will remain in the vertical elongated slot 102 and the lever 99 will move downwardly without actuating the loading mechanism of the station.

If however a package has been fed on to the fixed gravity feed station 89 previously to the passing of an empty vertical conveyor car 24 past the rock arm 108, the lock trip 87 will have been rocked downwardly into the position shown in dotted lines in Figure 4, drawing the station closing lever 99 over until the pin 101 registers with the enlarged portion of the slot 103.

With the parts in this position, the trip lever 51 on the car 24 will rock the arm 108 upwardly to cause the station closing lever 99 to move downwardly carrying with it the arm 100 and this, in turn, will cause the rotation of the shaft 109 to move the loading platforms 111 and 123 from the open to the closed position as shown in dotted lines, Figure 3.

As the loading platforms 111 and 123 are being closed, the automatic feed roll 91 will be actuated, thereby lifting the forward end of the package above the stop roll 92' and permitting it to gravitate down the loading platforms 123 and 111 to the stop bar 116 and into a position to be picked up by the empty vertical conveyor car 24 as it passes through the station.

As the loading platforms 111 and 123 are moved from the open to the closed position, the inward projecting end of the rock arm 135 will be moved downwardly into the position shown in dotted lines on Figure 3 so that as the now loaded vertical conveyor car 24 moves upwardly away from the automatic movable loading station, the radial arm 46 on said car will engage the inner end of the rock arm 135 and restore it to its normal position thereby rotating the rock shaft 109, and return the loading platforms, 111 and 123 to the open position.

It will be apparent that the vertical conveyor car 24 will always be loaded at the lowest or first loading station at which there is a package waiting and will carry its load up through the remaining loading station or stations without actuating the mechanism of such station.

The vertical conveyor cars 24 together with their loads are carried by the endless sprocket chains 25 and 26 about the periphery of sprocket wheels 22 and 23 which are so constructed as to permit the cars 24 to pass above the sprocket shaft 21 and down the rear of the vertical conveyor shaft to the fixed unloading station 10 which, in this instance, is located near the ceiling of the floor C.

The fixed unloading station 10 consists of two fixed gravity platforms 143 and 144 arranged at an angle to the horizontal plane of the vertical conveyor.

The platforms 143 and 144 consist of side rails 145 and 146 respectively, held in spaced relation by two horizontal channel bars 147 secured to the outer ends of each, said channel bars 147 being mounted on the side frames 12 of vertical conveyor 11.

The side rails 145 and 146 are spaced apart at their inner ends in the vertical plane of the center line of travel of the conveyor car 24 a sufficient distance to permit the free passage of the floor arm and supporting shaft 35 of the conveyor car 24, while the total width of the platforms 143 and 144 is less than the distance between the inner faces of the conveyor car floor arms 57 and 58.

Between the side rails 145 of the gravity platform 143 are journaled in spaced relation a plurality, in this case shown as two, of gravity rolls 148 which are in the plane of and cooperate with a plurality, in this case shown as five, of gravity rolls 149 journaled in spaced relation between the side rails 146 of the gravity platform 144. It will be apparent that as the vertical conveyor car 24 passes down through the fixed unloading station, the package carried thereby will be deposited upon the station gravity conveyor platforms 143 and 144 from which it will gravitate on to a gravity conveyor 150 so positioned that the gravity rolls 151 of such conveyor 150 are in the same plane as the rolls 142 of the platform conveyor 137.

So far as this invention is concerned, the disposition of the delivered load is immaterial, but as an illustration we have here shown on Figure 1, a receiving and storing station 9 comprising a belt conveyor 152 adapted to receive packages by gravity from gravity conveyor 150.

The belt conveyor 152 delivers the packages to a spiral roller conveyor 153 from which the packages proceed by gravity to a storage roller conveyor 154 on which they are held by a movable stop 155.

It will be understood that the number and spacing of the vertical conveyor cars 24 may be varied as desired depending upon the articles to be conveyed. It will also be understood that the exact arrangement of the various actuating parts of the mechanism here disclosed may be changed to a considerable degree without departing from the spirit of our invention, for although we have shown and described a specific apparatus and form and relation of the various parts thereof as an exemplification of an embodiment of our invention, we do not desire to restrict ourselves to the exact size, shape or relation of parts, as various changes may be made within the scope of the appended claims.

We claim:

1. In a conveying apparatus, elevating mechanism including spaced elevator cars, a loading station adjacent the elevator for supplying articles to an elevator car, said loading station including means for stopping an article at the station, a tiltable conveying platform, means actuated by a movable element on an empty elevator car for raising such articles above the stopping means and for tilting said conveying platform whereby the article is conveyed to a point where it will be picked up by said empty car, and means actuated by an article on a car for moving the movable element to an ineffective position.

2. In a conveying apparatus, elevating mechanism including spaced elevator cars, a loading station adjacent the elevator for supplying articles to an elevator car, said loading station including means for stopping an article at the station, a tiltable conveying platform, means actuated by a movable element on an empty elevator car for raising such articles above the stopping means and for tilting said conveying platform whereby the article is conveyed to a point where it will be picked up by said empty car, and means actuated by the elevator car after it has passed the leading station for returning said raising means and said conveying platform to normal position, and means actuated by an article on a car for moving the movable element to an ineffective position.

3. In a conveying apparatus an elevating mechanism including spaced elevator cars, a loading station for supplying an article to an elevator car, means for stopping the article at the loading station, means actuated by a movable member on an empty elevator car for releasing said article and conveying it to a point where it will be picked up by said empty elevator car, and means actuated by an article on such car for moving the movable member to an ineffective position.

4. In a conveying apparatus an elevating mechanism including spaced elevator cars, a loading station for supplying an article to an elevator car including a movable conveyor roll assembly, means for stopping the article at the loading station, means actuated by a movable member on an empty elevator car for releasing said article and moving the conveyor toll assembly to the loading position, and means actuated by the elevator car for returning said conveyor roll assembly to normal position after the elevator car has passed the station, and means actuated by an article on such car for moving the movable member to an ineffective position.

5. In a conveying apparatus, an elevating mechanism including spaced elevator cars, a loading station for supplying an article to an elevator car, means for holding an article at the loading station, normally ineffective means for releasing an article and moving it to the loading position, means actuated by an article on the loading station for placing the last named means in an effective position, and means on an elevator car for actuating such releasing and moving means.

6. In a conveying apparatus, an elevating mechanism including spaced elevator cars, a loading station for supplying an article to an elevator car, means for holding an article at the loading station, normally ineffective means for releasing an article and moving it to the loading position, means actuated by an article on the loading station for placing the last named means in an effective position, means on an elevator car for actuating such releasing and moving means, and means actuated by an article on the elevator car for making such last named means ineffective.

7. In a conveying apparatus, an elevating mechanism including spaced elevator cars, a loading station for supplying an article to an elevator car, means for holding an article at the loading station, normally ineffective means for releasing the article and moving it to the loading position, means including a vertically movable roller actuated by an article on a loading station for placing the last named means in an effective position, and means on an elevator car for actuating such releasing and moving means.

8. In a conveying apparatus, an elevating mechanism including spaced elevator cars, a loading station for supplying an article to an elevator car, means for holding an article at the loading station, normally ineffective means for releasing the article and moving it to the loading position, means including a vertically movable roller actuated by an article on a loading station for placing the last named means in an effective position, means on an elevator car for actuating such releasing and moving means, and means actuated by an article on the elevator car for making such last named means ineffective.

9. In a conveying apparatus, elevating mechanism including spaced elevator cars, a loading station for supplying articles to an elevator car, means including a roller for holding an article at the loading station, means including a vertically movable roller for releasing the article, normally ineffective conveying means for moving the article to the loading position, a movable member on an elevator car for actuating the releasing means and for moving the conveying means to the operative position, and means actuated by an article on a conveyor car for moving the movable member to an ineffective position.

10. In a conveying apparatus, elevating mechanism including spaced elevator cars, a loading station adjacent the elevator for supplying articles to an elevator car, said loading station including means for stopping an article at the station and a tiltable conveying platform, means connected with the platform and actuated by an empty elevator car for tilting said conveying platform and raising such article above the stopping means whereby the article is conveyed to a point where it will be picked up by said empty car.

11. In a conveying apparatus, elevating mechanism including spaced elevator cars, a loading station adjacent the elevator for supplying articles to an elevator car, said loading station including means for stopping an article at the station and a tiltable conveying platform, means connected with the platform and actuated by an empty elevator car for tilting said conveying platform and raising such article above the stopping means whereby the article is conveyed to a point where it will be picked up by said empty car, and means actuated by the elevator car after it has passed the loading station for returning the conveying platform and said raising means to normal position.

12. In a conveying apparatus, an elevating mechanism including spaced elevator cars, a loading station for supplying an article to an elevator car, means for holding an article on the loading station, means actuated by an empty elevator car for releasing an article on said station and conveying it to a point where it will be picked up by said empty elevator car, such means including a movable element associated with the article-releasing and conveying means and normally in an ineffective position and means actuated by an article on said loading station for moving the movable element to an effective position.

13. In a conveying apparatus, an elevating mechanism including spaced elevator cars, a loading station for supplying an article to an elevator car including a movable conveyor roll assembly, means for stopping the article at the loading station, means connected with the conveyor roll assembly and actuated by an empty elevator car for moving the conveyor roll assembly to the loading position and releasing said article, and means actuated by an elevator car for returning said conveyor roll assembly to normal position after the elevator car has passed the station.

14. In a conveying apparatus, elevating mechanism including spaced elevator cars, a loading station for supplying articles to an elevator car, means including a roller for holding an article at the loading station, normally ineffective conveying means for moving the article to the loading position, means for making such conveying means effective, means actuated by said conveying means including a vertical movable roller for releasing the article, means on an elevator car for actuating the means for making the conveying means effective, means for returning the conveying means to the normal position, and means on a conveyor car for actuating the last-named means.

In witness whereof we have hereunto set our hands this 16th and 25th day of April 1930, respectively.

JAMES T. COWLEY.
LAVONT C. ALLEN.